United States Patent
Jahanghir et al.

[19]

[11] Patent Number: 6,141,457
[45] Date of Patent: Oct. 31, 2000

[54] METHOD AND APPARATUS FOR PROCESSING A HIGH DEFINITION IMAGE TO PROVIDE A RELATIVELY LOWER DEFINITION IMAGE USING BOTH DISCRETE COSINE TRANSFORMS AND WAVELET TRANSFORMS

[75] Inventors: Musa Jahanghir, Hayward; Jack Chaney; Michael A. Kaufman, both of San Jose, all of Calif.

[73] Assignee: Samsung Electronics Co., Ltd., Suwon, Rep. of Korea

[21] Appl. No.: 09/001,880

[22] Filed: Dec. 31, 1997

Related U.S. Application Data

[60] Provisional application No. 60/058,697, Sep. 12, 1997.

[51] Int. Cl.[7] .................................................... G06K 9/36
[52] U.S. Cl. .................................... 382/250; 382/248
[58] Field of Search .................................. 382/250, 244, 382/245, 246, 249, 248; 348/395, 403–408, 397, 398, 399, 437, 438, 384, 419, 416; 341/50; 364/745; 358/310, 335, 342

[56] References Cited

PUBLICATIONS

Ding, Jinghua. "Three–dimensional multiresolution video compression strategy for using human visual characteristics." Communications, 1997. ICC'97 Montreal, towards the Knowledge Millennium. 1997, vol. 3, pp. 1669–1673.

*Primary Examiner*—Jose L. Couso
*Assistant Examiner*—Shawn B. Cage
*Attorney, Agent, or Firm*—Sherman & Sherman; Kenneth L. Sherman, Esq.; Jeffrey P. Aiello, Esq.

[57] ABSTRACT

A method and an apparatus for processing a high definition image using both an inverse discrete cosine transform (IDCT) and an inverse discrete wavelet transform (IDWT) to provide a relatively lower definition image is provided. Image data encoded with a discrete cosine transform (DCT) is decoded using both an IDCT and an IDWT to generate IDCT processed image data and IDWT reduced image data. The IDCT processed image data and the IDWT reduced image data are combined to generate reduced image data that has a relatively lower definition than the image data and a relatively higher definition than the IDWT reduced image data.

21 Claims, 5 Drawing Sheets

METHOD AND APPARATUS FOR PROCESSING A HIGH DEFINITION IMAGE TO PROVIDE A RELATIVELY LOWER DEFINITION IMAGE USING BOTH DISCRETE COSINE TRANSFORMS AND WAVELET TRANSFORMS

RELATED APPLICATION

This patent application claims priority from provisional patent application Serial No. 60/058,697, filed on Sep. 12, 1997, entitled "Methods and Arrangements For Converting A High Definition Image To A Lower Definition Image Using Wavelet Transforms," which is incorporated herein in its entirety by reference.

FIELD OF THE INVENTION

The invention relates to multimedia images and digital communications, and more particularly to a method and apparatus for processing a high definition image to provide a relatively lower definition image using both discrete cosine transforms and wavelet transforms.

BACKGROUND OF THE INVENTION

The introduction of high definition television (HDTV) has generated a large amount of publicity because of the superior performance characteristics of HDTV relative to standard definition television (SDTV). HDTV offers approximately twice the vertical and horizontal resolution of standard definition television (SDTV), providing picture quality approaching that of 35 mm film. Since HDTV signals are digital and virtually free of noise, HDTV offers sound quality approaching that of a compact disc (CD) and does not suffer from some of the shortcomings of SDTV such as crosscolor and crosslumina. HDTV also has lower transmission costs because of error correction codes currently only available with digital formats. In addition, HDTV provides multicasting, which enables broadcasters to split programming transmission into multiple channels, and a higher level of interactivity than SDTV, allowing end users to manipulate a television program at the point of reception.

Despite the technical advantages that HDTV provides over SDTV, the widespread implementation and acceptance of HDTV as a new standard depends upon the resolution of several important issues. One of the most important issues is how to implement HDTV while continuing to support the large number of existing SDTV display devices already in use. Most SDTV display devices cannot decode an HDTV signal and cannot be used in a pure HDTV broadcast environment. Moreover, the relatively high cost of HDTV display devices makes replacing existing SDTV display devices with HDTV display devices impractical. Thus, a widespread implementation of HDTV must address the problem of how to support the existing SDTV display devices currently in use.

One solution to this problem is for service providers to transmit programs in both HDTV and SDTV formats (simulcast). This could be done by transmitting both an HDTV signal and an SDTV signal, or by augmenting an SDTV signal with additional information necessary to "enhance" the SDTV signal to provide a HDTV signal. With this approach, SDTV display devices only process the SDTV portion of the signal while ignoring the additional information. On the other hand, HDTV display devices process both the SDTV signal information and the additional information. Although this approach solves the problem of how to implement HDTV while supporting existing SDTV display devices, it consumes a considerable portion of the available distribution bandwidth making it very undesirable to service providers.

An alternative solution is for service providers to transmit programs in HDTV format only and for all display units to incorporate a special decoder, sometimes referred to as an "all format decoder," that has the ability to decode both standard definition (SD) and high definition (HD) video from the HDTV signal. This approach is attractive from several standpoints. First, an all format decoder can be included in all new HDTV display devices. In addition, an all format decoder can be sold separately as a stand-alone unit that can be attached to existing SDTV display devices. This allows new HDTV display devices can take full advantage of the new HDTV technology while allowing existing SDTV display devices to continue to be used.

Conventional all-format decoders consist of an SDTV decoder, e.g. an MPEG-2 decoder, with a number of enhancements. An HDTV signal is first preprocessed to discard or decimate information that is not needed for a standard definition display, such as high-frequency coefficients. This reduces the amount of data in the preprocessed HDTV signal, reducing the required bandwidth and allowing a smaller channel buffer to be used. The reduced amount of data also simplifies subsequent processing of the preprocessed signal.

Next, the remaining portions of the encoded image data are decoded using any of the well known video sampling techniques such as a high definition 4:4:4 video sampling technique, or a lower definition video sampling technique such as 4:2:2 or 4:2:0. Conventional MPEG decoders use an inverse discrete cosine transform (IDCT) process to decode video-related data that was previously encoded using a discrete cosine transform (DCT) process. *Digital Video: An Introduction To MPEG*-2 by Barry G. Haskell, Atul Puri and Arun N. Netravali, provides useful background information on decoding video-related data and is incorporated by reference herein in its entirety.

Image data encoded and decoded by conventional encoders and decoders typically includes luminance data ($Y_C$) and two types of chrominance data referred to as ($U_C$) and ($V_C$). To display a high definition image (1920 by 1080 pixels), a typical decoder provides 1920 by 1080 pixels of luminance-related data and 960 by 540 pixels of chrominance-related data. The resulting data provides a 4:2:0 image having 1920 by 1080 pixels.

Following the decoding process, the decoded image data is then filtered and/or decimated to further reduce the image for display on a lower resolution display. By way of example, the lower definition image provided by certain decoders is ¼ the size (¼ number of pixels) of the original higher definition image. Thus, for a 1920 by 1080 pixel image (2,073,600 total pixels), the lower definition image is 960 by 540 pixels (518,400 pixels). Thus, a lower definition image has less information than a higher definition image.

Consider the conventional system 100 illustrated in FIG. 1 for encoding, transmitting and decoding image data. An image is scanned or otherwise processed to create image data 102, which is typically in the form of an image file. Image data 102 is provided to an encoder 104. Encoder 104 encodes image data 102 and provides encoded image data. The encoded image data is transmitted to a decoder 106 via a link 108. Link 108 can include one or more communication mediums and/or systems and supporting apparatuses that are configured to carry the encoded image data between encoder 104 and decoder 106. Examples of link 108 include, but are not limited to, a telephone system, a cable television system, a broadcast television system (direct or indirect), a satellite broadcast system (direct or indirect), one or more computer networks and/or buses, the Internet, an intranet, and any software, hardware and other communication systems and equipment associated therewith for transmitting encoded data between two locations.

Decoder 106 decodes the encoded image data received from encoder 104 and provides decoded image data 110 that is suitable for reproduction with a display 112. Ideally, decoded image data 110 is identical to image data 102. However, limitations in the encoding and decoding processes performed by encoder 104 and decoder 106 respectively, sometimes alter the data, adversely affecting the quality of decoded image data 110 when displayed on display 112.

In certain embodiments, encoder 104 and/or decoder 106 include one or more processors that each are coupled to a memory. The processor(s) respond to computer implemented instructions stored within the memories to encode or decode image data 102 as required. In other embodiments, encoder 104 and/or decoder 106 include logic that is configured to encode or decode image data 102 as required.

FIG. 2A is a block diagram depicting a conventional system 200 for reducing a high definition image to a lower definition image. Image data 202 is provided to an encoder 204 that encodes image data 202 and provides encoded image data. Encoder 204 includes a DCT process 206 that encodes image data 202 using a DCT.

The encoded image data provided by encoder 204 is transmitted to a decoder 208 via a link 210. Link 210 communicatively couples encoder 204 and decoder 208 and provides for the transmission of data between encoder 204 and decoder 208 as previously described in regard to link 108 of FIG. 1.

Decoder 208 includes a pre-parser process 212, an IDCT process 214 and a post filter process 216. Pre-parser process 212 decimates, filters, masks, and/or otherwise reduces the amount of encoded image data from encoder 204 and provides a subset of the encoded image data to IDCT process 214. IDCT process 214 decodes the subset of the encoded image data and provides a decoded subset of the encoded image data to post filter process 216.

Post filter process 216 further processes and configures the decoded subset of the encoded image data, typically by decimating, filtering and/or otherwise down-sampling the decoded subset of the encoded image data and provides reduced image data 218. Reduced image data 218 represents a lower definition image than the image represented by decoded image data 110 (FIG. 1) and is suitable for display on a lower resolution display.

FIG. 2B depicts example matrix operations 220 associated with a conventional DCT/IDCT process. Matrix D is an 8 by 8 matrix (e.g., a macroblock) of image data that is multiplied by the 8 by 8 DCT/IDCT coefficient matrixes C and $C^T$ to produce an 8 by 8 matrix T of image data. The coefficients applied in the matrices of FIG. 2B are based upon a conventional DCT such as:

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N}$$

with: u, v, x, y=0, 1, 2, . . . N−1 where: x, y are spatial coordinates in the sample domain and u, v are coordinates in the transform domain $$C(u), C(v) = \begin{cases} \frac{1}{\sqrt{2}} & \text{for } u, v = 0; \text{ otherwise } 1 \end{cases}$$

and a conventional IDCT such as:

$$f(x, y) = \frac{2}{N} \sum_{u=0}^{N-1} \sum_{v=0}^{N-1} C(u)C(v)F(u, v)\cos\frac{(2x+1)u\pi}{2N} \cos\frac{(2y+1)v\pi}{2N}$$

This conventional DCT and conventional IDCT can be found in Annex A of the Revised Text for ITU-T Recommendation H.262/ISO/IEC 13818-2:1995, *Information Technology—Generic Coding of Moving Pictures and Associated Audio Information*, which is incorporated herein in its entirety.

Table 1 of this application contains an example computer program that implements the conventional IDCT above. Section T100 of Table 1 and Section T200 of Table 2 illustrate mathematical steps that implement the IDCT. Sections T202 and T204 of Table 2 illustrate coefficients used with the aforementioned DCT and IDCT respectively.

Although the all-format encoder approach has significant advantages over other approaches for implementing HDTV, the conventional approaches for converting an HDTV image to a lower definition image suitable for display on an SDTV display device have some significant limitations. Specifically, conventional approaches cause video-related information to be lost both before and after the IDCT process adversely affecting the symmetry of the resulting decoded image, providing a lower quality image.

Based on the need to convert high definition images to relatively lower definition images and the limitations in the prior approaches, an approach for converting high definition images to relatively lower definition images that avoids the problems associated with the prior approaches is highly desirable.

SUMMARY OF THE INVENTION

High definition images are converted to relatively lower definition images using wavelet transforms. According to one aspect of the invention, a method is provided for processing image data that has been encoded using a discrete cosine transform to provide reduced image data having a relatively lower definition than the image data. According to the method, image data that has been encoded using a discrete cosine transform is received. Then the image data is processed with an inverse discrete cosine transform (IDCT) to cause IDCT processed image data to be generated, wherein the IDCT processed image data has a relatively lower definition than the image data. Then, the image data is processed with an inverse discrete wavelet transform (IDWT) to cause IDWT reduced image data to be generated, wherein the IDWT reduced image data has a relatively lower definition than the image data. Finally, reduced image data is generated using both the IDCT processed image data and the IDWT reduced image data, wherein the reduced image data has a relatively higher definition than the IDWT reduced image data and a relatively lower definition than the image data.

According to another aspect of the invention, a system is provided for processing image data that has been encoded using a discrete cosine transform to provide reduced image data having a relatively lower definition than the image data. The system includes a receiver, a decoder and a generator. The receiver receives image data that has been encoded using a discrete cosine transform. The decoder includes an inverse discrete cosine transform (IDCT) process configured to decode the image data and cause IDCT processed image data to be generated, wherein the IDCT processed image data has a relatively lower definition than the image data. The decoder also includes an inverse discrete wavelet transform (IDWT) process configured to decode the image data and cause IDWT reduced image data to be generated, wherein the IDWT reduced image data has a relatively lower definition than the image data. The generator generates reduced image data using both a IDCT processed image data and the IDWT reduced image data, wherein the reduced image data has a relatively higher definition than the IDWT reduced image data.

BRIEF DESCRIPTION OF THE DRAWINGS

Embodiments of the invention are illustrated by way of example, and not by way of limitation, in the figures of the accompanying drawings and in which like reference numerals refer to similar elements and in which.

Figure 1:
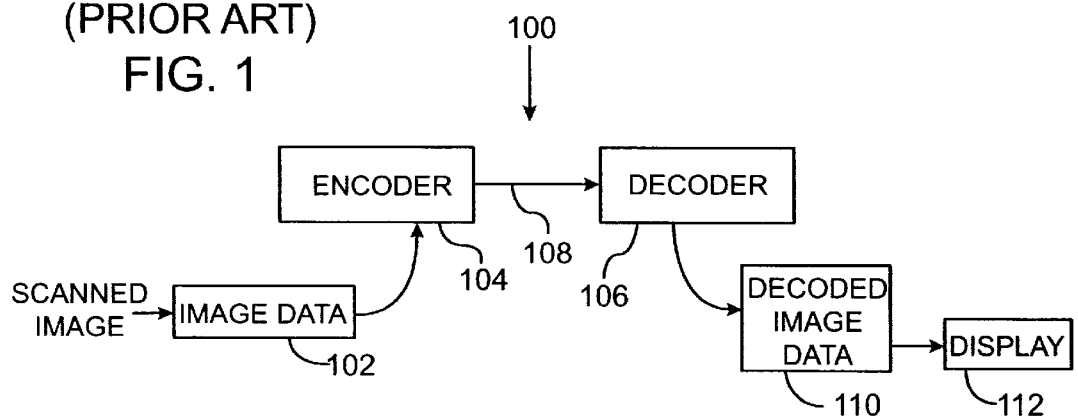
FIG. 1 is a block diagram depicting a conventional system for encoding, transmitting and decoding image data.
Figure 2A:
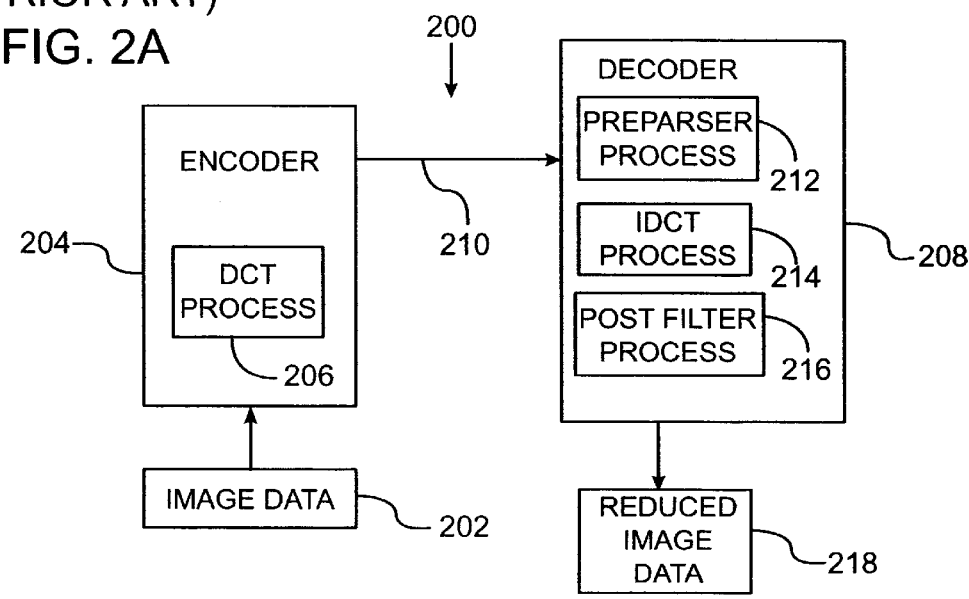
FIG. 2A is a block diagram of a conventional system for reducing a high definition image to a lower definition image.
Figure 2B:
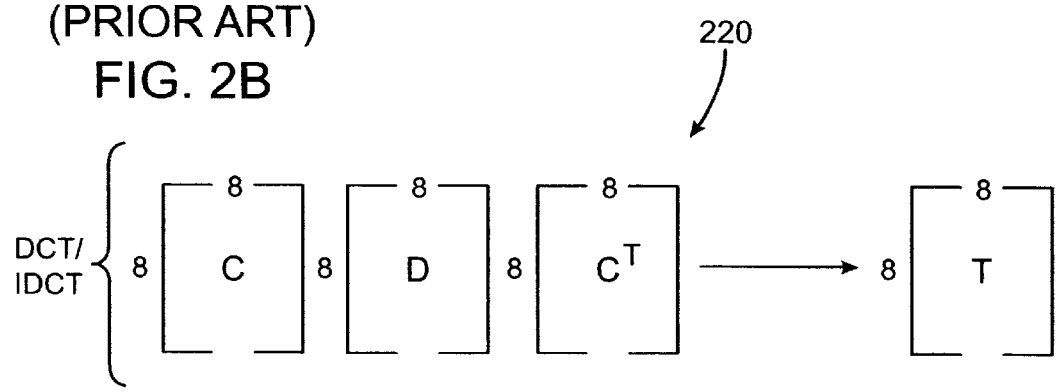
FIG. 2B depicts example matrix operations associated with a conventional DCT/IDCT process.

Table 1 contains a computer program for implementing a conventional IDCT;

Table 2 illustrates a formula and coefficients for implementing a conventional IDCT and an IDWT according to an embodiment of the invention; and Table 3 contains a computer program for implementing a fast IDWT according to an embodiment of the invention.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

In general, high definition images are converted to relatively lower definition images using both an IDCT process and discrete wavelet transforms or "wavelets." Wavelets are well known mathematical functions that divide data into different frequency and spatial components and then analyze each frequency component and space with a resolution matched to its scale. Wavelets provide advantages over traditional Fourier methods for analyzing physical situations, particularly where a signal contains discontinuities and sharp spikes. A useful reference on the subject of wavelets is *Wavelets and Filter Banks*, authored by Gilbert Strang and Truong Nguyen, Wellesley-Cambridge Press, the entire contents of which are incorporated herein by reference.

In the context of converting a high definition image to a relatively lower definition image, the use of both an IDCT and an inverse discrete wavelet transform (IDWT) to decode and decimate a high definition image and the subsequent combining of the results provides a more symmetrical lower definition image using fewer system resources than can be achieved using conventional IDCT techniques.

Processing Image Data Using IDCTs and IDWTs

According to an embodiment of the invention, the decoding and decimation of DCT encoded image data is performed using both an IDCT process and an IDWT process. The results are then combined to provide image data which may be displayed on a lower resolution display as a 4:2:0 video image. This 4:2:0 video image is symmetrical because the received encoded image data is not pre-parsed or otherwise filtered prior to being decoded by the IDWT process.

The IDWT process, as applied to the received encoded image data, inherently decimates or down-samples the amount of video data. The IDWT takes advantage of the reducing capability of one or more wavelet transforms, for example, as applied to discrete blocks of received encoded video data, through the coefficients of the IDWT. Thus, decoding DCT encoded image data using an IDWT provides a higher quality lower definition image that more accurately represents the original image data. In addition, the decoding process can be performed much faster and requires fewer system resources than conventional IDCT processes.

Figure 3:
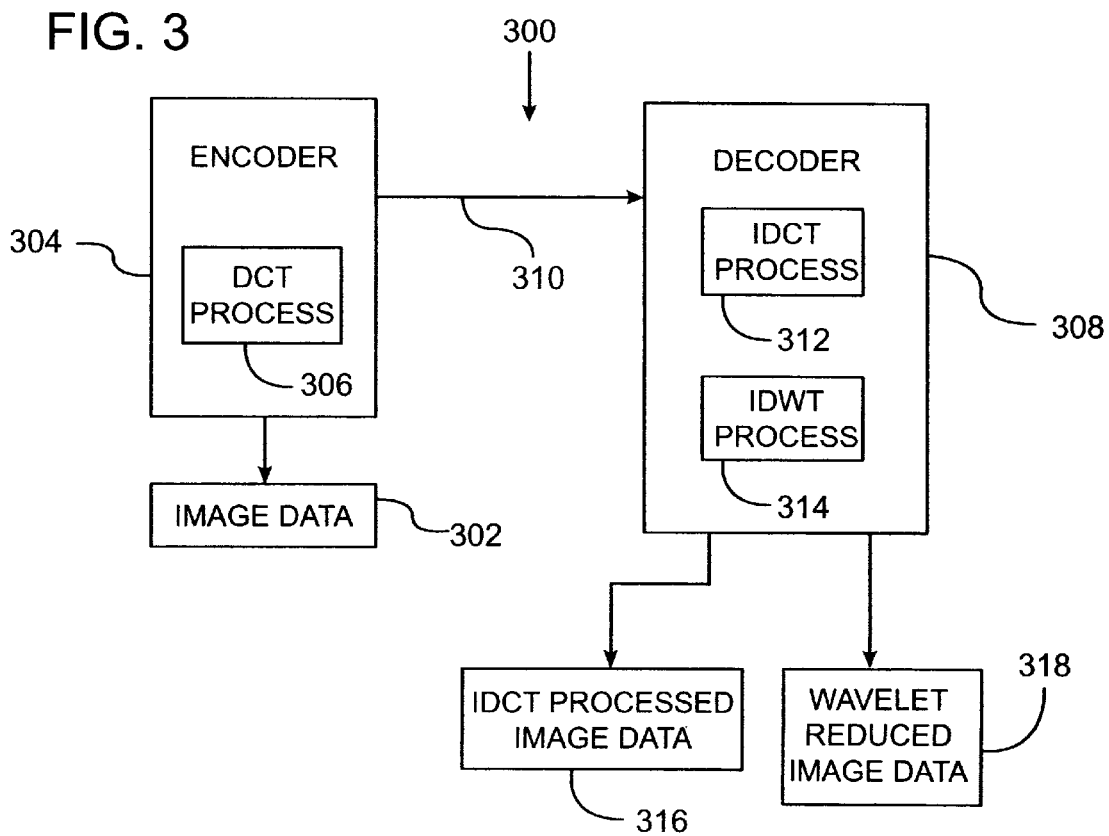
FIG. 3 is a block diagram of a system for converting a high definition image to a relatively lower definition image according to an embodiment of the invention.

FIG. 3 is a block diagram depicting a system 300 for processing a high definition image using both an IDCT process and an IDWT process to provide a relatively lower definition image in accordance with an embodiment of the invention. Image data 302 is provided to an encoder 304 that encodes image data 302 and provides encoded image data. Encoder 304 includes a DCT process 306 for encoding image data 302 as previously described. The encoded image data provided by encoder 304 is transmitted to a decoder 308 over a link 310. Encoder 304 is communicatively coupled to decoder 308 via link 310 that provides for the transmission of data between encoder 304 and decoder 308 as previously described for links 108 and 210.

Decoder 308 includes both an IDCT process 312 and an IDWT process 314. The decoding of the encoded image data by IDCT process 312 provides IDCT processed image data 316 that represents (has the same definition as) the higher definition image as encoded by DCT process 306. IDCT processed image data 316 includes luminance data ($Y_C$) and two types of chrominance data ($U_C$) and ($V_C$) IDCT process 312 may be implemented with a variety of IDCT processes, for example an IDCT process in accordance with MPEG-2 standards.

IDWT process 314 decodes and decimates the encoded image data to provide wavelet reduced image data 318, that has a lower definition (fewer pixels) than the encoded image data. Wavelet reduced image data 318 includes luminance data ($Y_W$) and two types of chrominance data ($U_W$) and ($V_W$). According to one embodiment of the invention, wavelet reduced image data 318 represents a 4:2:0 video image.

Figure 4:
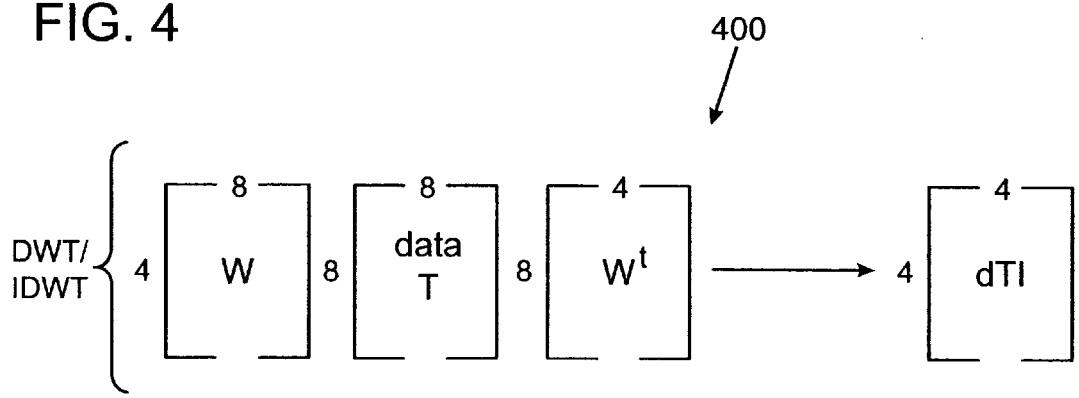
FIG. 4 illustrates matrix operations associated with an DWT/IDWT process according to an embodiment of the invention.

FIG. 4 depicts example matrix operations 400 associated with IDWT process 314 according to an embodiment of the invention. The data T matrix is received from encoder 304 via link 310 and multiplied by a 4 by 8 IDWT coefficient matrix W and a 8 by 4 IDWT coefficient matrix $W^T$ to produce a 4 by 4 matrix dTI. The coefficients applied in the matrices in FIG. 4 are based upon the following DWT and IDWTs:

The coefficients applied in the matrices in FIG. 4 are based upon the following DWT:

$$U(x) = \frac{1}{\sqrt{2}}(idct(x) + idct(x+1))$$

and the following IDWT:

$$f(x) = \frac{1}{\sqrt{2}}(U(x) + 0))$$

Table 2 contains an exemplary computer program that implements an IDWT process. Sections T206 and T208 of Table 2 illustrate coefficients used with the DWT and IDWT according to an embodiment of the invention.

In accordance with certain aspects of the invention, different wavelet transforms can be used within specific systems and/or for certain types of images. The wavelet reference (Strang et al.) listed above presents several different wavelets that can used in the methods and arrangements of the invention, however additional wavelets are also known and can be adapted for use in the invention. For example, specific wavelets may be used for frame and field pictures.

Figure 5:
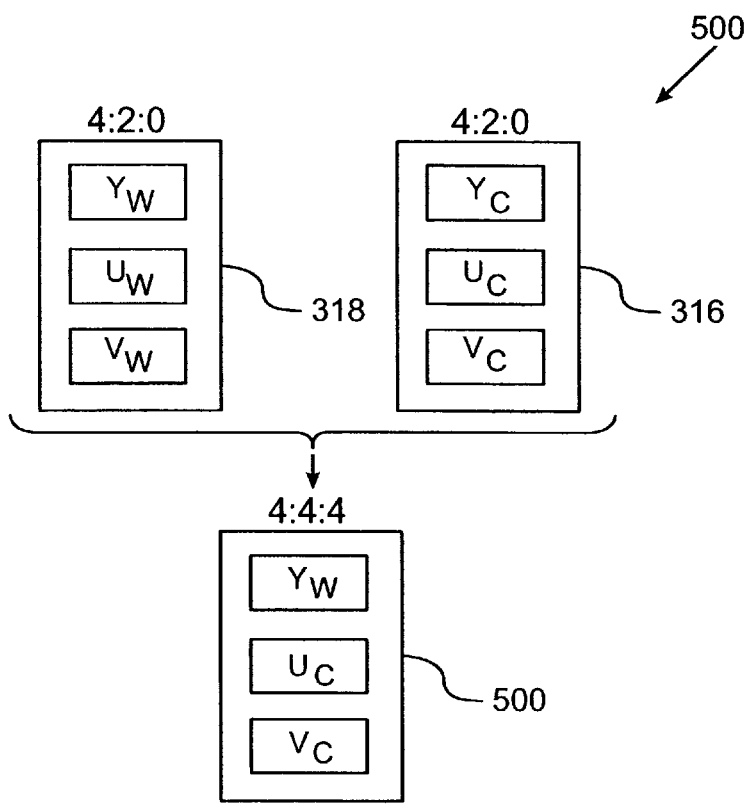
FIG. 5 illustrates combining IDCT processed image data and IDWT reduced image data to provide reduced image data according to an embodiment of the invention.

The generation of a lower definition video image based upon IDCT processed image data 316 and wavelet reduced image data 318 is described with reference to FIG. 5. FIG. 5 illustrates IDCT processed image data 316 and wavelet reduced image data 318 which each provide a 4:2:0 video image and which are combined to provide a lower definition video image 500.

As depicted in FIG. 5, lower definition image 500 is produced, in accordance with an embodiment of the invention, by combining the $Y_W$ data from wavelet reduced image data 318 with the $U_C$ data and the $V_C$ data from IDCT processed image data 316. According to one embodiment of the invention, hybrid image 500 is a 4:4:4 video image that has a higher definition than the 4:2:0 video image represented by wavelet reduced image data 318.

Figure 6:
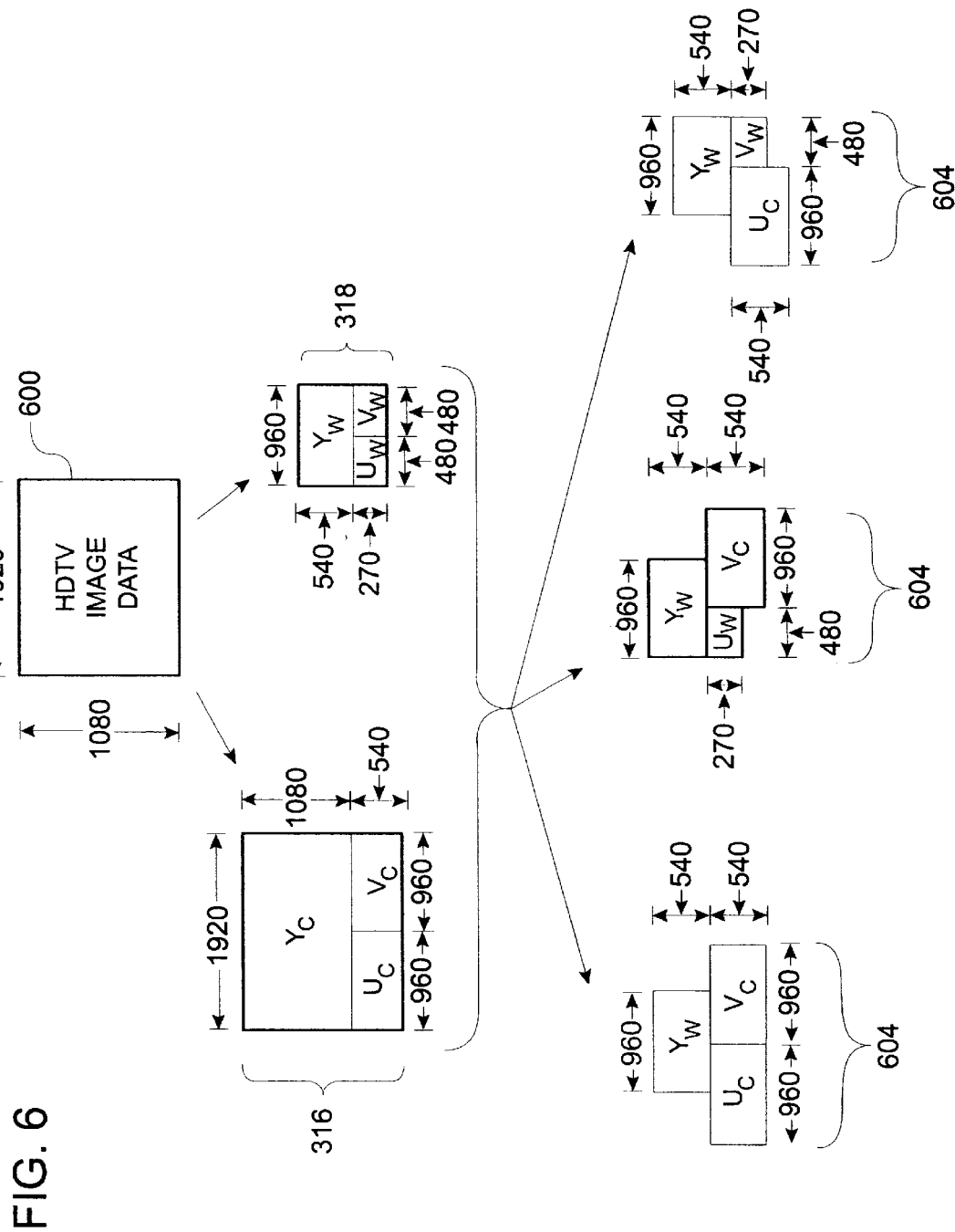
FIG. 6 depicts the processing of HDTV image data to provide relatively lower definition image data according to an embodiment of the invention.

The processing of an HDTV video image using both an IDCT process and an IDWT process to provide a lower definition video image according to an embodiment of the invention is now described with reference to both FIGS. 3 and 6. HDTV image data 600 (FIG. 6) having 1920 by 1080 pixels (2,073,600 pixels total) is converted using IDCT process 312, for example an IDCT process in accordance with MPEG-2 standards, to produce IDCT processed image data 316 that consists of 1920 by 1080 pixels (2,073,600 pixels total) of $Y_C$ data, 960 by 540 pixels (518,400 pixels total) of $U_C$ data and 960 by 540 pixels (518,400 pixels total) of $V_C$ data. Thus, IDCT reduced image data 316 has the same definition (same number of pixels) as HDTV image data 600.

HDTV image data 600 is also converted using IDWT process 314 to provide wavelet reduced image data 318 that consists of 960 by 540 pixels (518,400 pixels total) of $Y_W$ data, 480 by 270 pixels (129,600 pixels total) of $U_W$ data and 480 by 270 pixels (129,600 pixels total) of $V_W$ data. Thus, wavelet reduced image data 318 has a relatively lower definition (fewer pixels) than HDTV image data 600.

IDCT processed image data 316 and wavelet reduced image data 318 are combined in accordance with embodiments of the invention to provide various reduced image data that each have a relatively higher definition than the 4:2:0 video image represented by wavelet reduced image data 318 but a relatively lower definition than HDTV image data 600.

According to one embodiment of the invention, IDCT processed image data 316 and wavelet reduced image data 318 are combined to provide reduced image data 602 that includes 960 by 540 pixels (518,400 pixels total) of $Y_W$ data, 960 by 540 pixels (518,400 pixels total) of $U_C$ data and 960 by 540 pixels (518,400 pixels total) of $V_C$ data.

According to another embodiment of the invention, IDCT processed image data 316 and wavelet reduced image data 318 are combined to provide reduced image data 604 that includes 960 by 540 pixels (518,400 pixels total) of $Y_W$ data, 480 by 270 pixels (129,600 pixels total) of $U_W$ data and 960 by 540 pixels (518,400 pixels total) of $V_C$ data.

According to another embodiment of the invention, IDCT processed image data 316 and wavelet reduced image data 318 are combined to provide reduced image data 606 that includes 960 by 540 pixels (518,400 pixels total) of $Y_W$ data, 960 by 540 pixels (518,400 pixels total) of $U_C$ data and 480 by 270 pixels (129,600 pixels total) of $V_W$ data.

Hardware Overview

Figure 7:
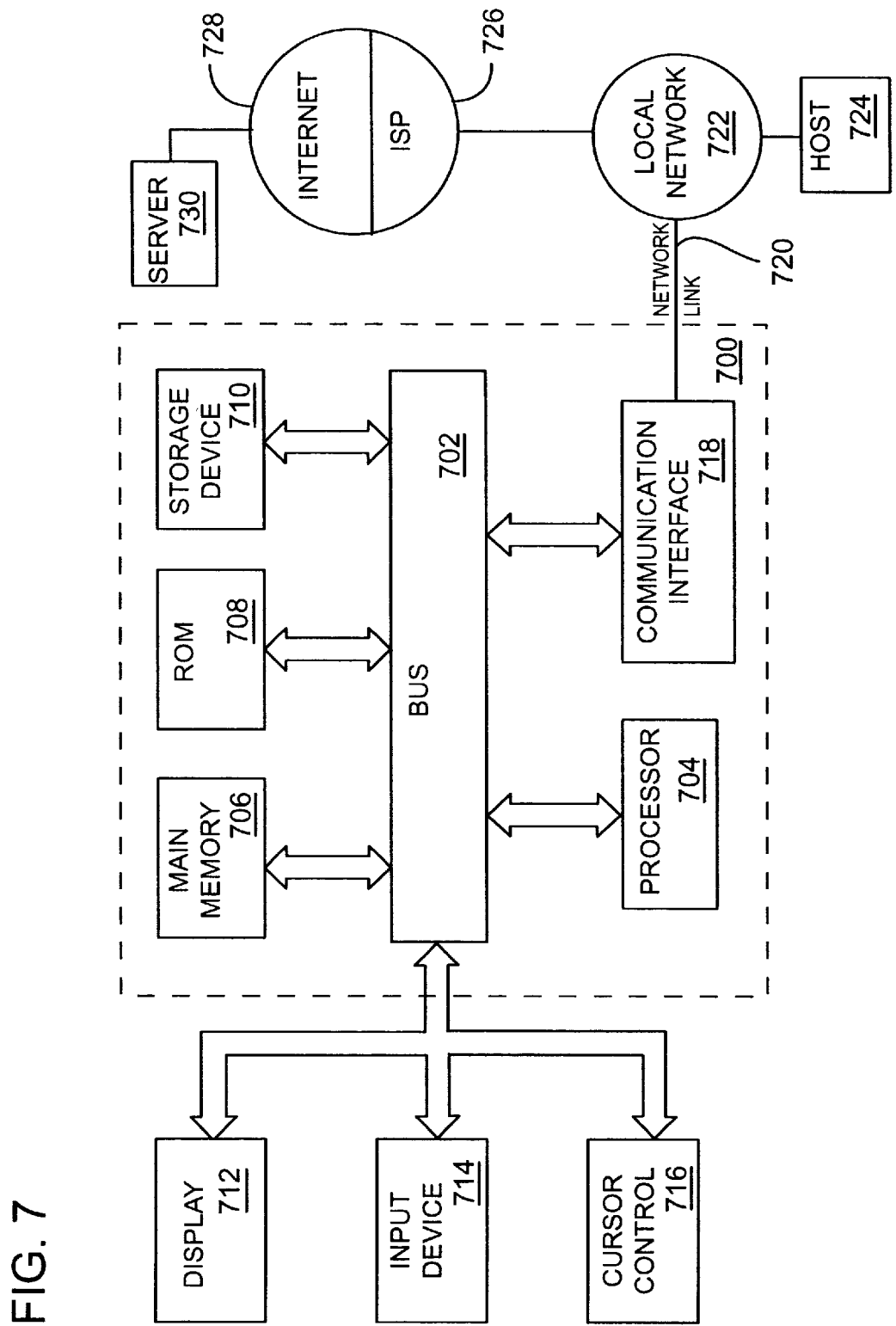
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for converting a high definition image to a relatively lower definition image using wavelet transforms. According to one embodiment of the invention, converting a high definition image to a relatively lower definition image using wavelet transforms is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the conversion of a high definition image to a relatively lower definition image using wavelet transforms as described herein.

Communication interface 718 may be a USB/Tuner and network link 720 may be an antenna or cable for connecting computer system 700 to a cable provider, satellite provider or other terrestrial transmission system for receiving messages, data and program code from another source.

The received code may be executed by processor 704 as it is received, and/or stored in storage device 710, or other non-volatile storage for later execution. In this manner, computer system 700 may obtain application code in the form of a carrier wave.

The invention provides several advantages over prior approaches for converting a high definition image to a relatively lower definition image. First, the use of an IDWT process avoids pre-parsing or otherwise filtering image data prior to being decoded by the IDWT process, resulting in a symmetrical video image. Thus, decoding DCT encoded image data using an IDWT provides a higher quality lower definition image that more accurately represents the original image data. In addition, the decoding process can be performed much faster and requires fewer system resources than conventional IDCT processes. Moreover, by combining the results of both the IDCT and IDWT processes, video images having a higher definition than a video image provided only by an IDWT process can be generated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

TABLE 1

```
/* idct.c, inverse fast discrete cosine transform              */
/* Copyright (C) 1996, MPEG Software Simulation Group. All Rights Reserved.   */
/*
 * Disclaimer of Warranty
```

TABLE 1-continued

```
*
* These software programs are available to the user without any license fee or
* royalty on an "as is" basis. The MPEG Software Simulation Group disclaims
* any and all warranties, whether express, implied, or statuary, including any
* implied warranties or merchantability or of fitness for a particular
* purpose. In no event shaft the copyright-holder be liable for any
* incidental, punitive, or consequential damages of any kind whatsoever
* arising from the use of these programs.
*
* This disclaimer of warranty extends to the user of these programs and user's
* customers, employees, agents, transferees, successors, and assigns.
*
* The MPEG Software Simulation Group does not represent or warrant that the
* programs furnished hereunder are free of infringement of any third-party
* patents.
*
* Commercial implementations of MPEG-1 and MPEG-2 video, including shareware,
* are subject to royalty fees to patent holders. Many of these patentsare
* general enough such that they are unavoidable regardless of implementation
* design.
*
*/
/**********************************************************/
/* inverse two dimensional DCT, Chen-Wang algorithm         */
/* (cf. IEEE ASSP-32,. pp. 803–816, Aug. 1984)              */
/* 32-bit integer arithmetic (8 bit coefficients)           */
/* 11 mults, 29 adds per DCT                                */
/*                                         sE, 18.8.91     */
/**********************************************************/
/* coefficients extended to 12 bit for IEEE1180–1990        */
/* compliance                              sE, 2.1.94      */
/**********************************************************/
/* this code assumes >> to be a two's-complement arithmetic */
/* right shift: (-2)>>1 == -1, (-3)>>1 == -2                */
#include "config.h"
#define W1 2841 /* 2048*sqrt(2)*cos(1*pi/16) */
#define W2 2676 /* 2048*sqrt(2)*cos(2*pi/16) */
#define W3 2408 /* 2048*sqrt(2)*cos(3*pi/16) */
#define W5 1609 /* 2048*sqrt(2)*cos(5*pi/16) */
#define W6 1108 /* 2048*sqrt(2)*cos(6*pi/16) */
#define W7 565  /* 2048*sqrt(2)*cos(7*pi/16) */
/* global declarations */
void Initialize_Fast_IDCT_ANSI_ARGS_((void));
void Fast_IDCT_ANSI_ARGS_((short *block));
/* private data */
static short iclip[1024]; /* clipping table */
static short *iclp;
/* private prototypes */
static void idctrow _ANSI_ARGS_((short *blk));
static void idctcol _ANSI_ARGS_((short *blk));
/*   row (horizontal) IDCT
 *
 *
 *
```

$$dst[k] = \sum_{l=0}^{7} c[l] * src[l] * \cos\left(\frac{pi}{8} * \left(k + \frac{1}{2}\right) * 1\right)$$

```
 *
 *
 *   where:     c[0]     = 128
 *              c[1..7]  = 128*sqrt(2)
 */
static void idctrow(blk)
short *blk;
{
    int x0, x1, x2, x3, x4, x5, x6, x7, x8;
    /* shortcut */
    if (!(  (x1 = blk[4]<<11) | (x2 = blk[6]) | (x3 = blk[2]) |
            (x4 = blk[1]) | (x5 = blk[7]) | (x6 = blk[5]) | (x7 = blk[3])))
    {
        blk[0]=blk[1]=blk[2]=blk[3]=blk[4]=blk[5]=blk[6]=blk[7]=blk[0]<<3;
        return;
    }
    x0 = (blk[0]<<11) + 128; /* for proper rounding in the fourth stage */
    /* first stage */                      |
    x8 = W7*(x4+x5);                       |
    x4 = x8 + (W1-W7) *x4;                 |
    x5 = x8 - (W1+W7) *x5;                 |
```

TABLE 1-continued

```
        x8 = W3*(x6+x7);
        x6 = x8 - (W3-W5) *x6;
        x7 = x8 - (W3+W5) *x7;
        /* second stage */
        x8 = x0 + x1;
        x0 -= x1;
        x1 = W6* (x3+x2);
        x2 = x1 - (W2+W6) *x2;
        x3 = x1 + (W2-W6) *x3;
        x1 = x4 + x6;
        x4 -= x6;
        x6 = x5 + x7;
        x5 -= x7;                        — T100
        /* third stage */
        x7 = x8 + x3;
        x8 -= x3;
        x3 = x0 + x2;
        x0 -= x2;
        x2 = (181* (x4+x5)+128)>>8;
        x4 = (181* (x4-x5)+128)>>8;
        /* fourth stage */
        blk[0] = (x7+x1)>>8;
        blk[1] = (x3+x2)>>8;
        blk[2] = (x0+x4)>>8;
        blk[3] = (x8+x6)>>8;
        blk[4] = (x8-x6)>>8;
        blk[5] = (x0-x4)>>8;
        blk[6] = (x3-x2)>>8;
        blk[7] = (x7-x1)>>8;
}
/*  column (vertical) IDCT
 *
 *
 *
```

$$dst[8*k] = \sum_{l=0}^{7} c[l] * src[8*l] * \cos\left(\frac{pi}{8} * \left(k + \frac{1}{2}\right) * l\right)$$

```
 *
 *
 *  where:   c[0]    = 1/1024
 *           c[1..7] = (1/1024)*sqrt(2)
 */
static void idctcol(blk)
short *blk;
{
        int x0, x1, x2, x3, x4, x5, x6, x7, x8;
        /* shortcut */
        if (!(  (x1 = (blk[8*4]<<8)) | (x2 = blk[8*6]) | (x3 = blk[8*2]) |
                (x4 = blk[8*1]) | (x5 = blk[8*7]) | (x6 = blk[8*5]) | (x7 = blk[8*3])))
{
        blk[8*0]=blk[8*1]=blk[8*2]=blk[8*3]=blk[8*4]=blk[8*5]=blk[8*6]=blk[8*7]=
                iclp[(blk[8*0]+32)>>6];
        return;
}
        x0 = (blk[8*0]<<8) + 8192;
        /* first stage */
        x8 = W7*(x4+x5) + 4;
        x4 = (x8+(W1-W7) *x4)>>3;
        x5 = (x8-(W1+W7) *x5)>>3;
        x8 = W3* (x6+x7) + 4;
        x6 = (x8-(W3-W5) *x6)>>3;
        x7 = (x8-(W3+W5) *x7)>>3;
        /* second stage */
        x8 = x0 + x1;
        x0 -= x1;
        x1 = W6*(x3+x2) + 4;
        x2 = (x1-(W2+W6) *x2)>>3;
        x3 = (x1+(W2-W6) *x3)>>3;
        x1 = x4 + x6;
        x4 -= x6;
        x6 = x5 + x7;
        x5 -= x7;
        /* third stage */
        x7 = x8 + x3;
        x8 -= x3;
        x3 = x0 + x2;
        x0 -= x2;
        x2 = (181* (x4+x5)+128)>>8;
```

TABLE 1-continued

```
    x4 = (181* (x4−x5)+128)>>8;
    /* fourth stage */
    blk[8*0] = iclp[(x7+x1)>>14];
    blk[8*1] = iclp[(x3+x2)>>14];
    blk[8*2] = iclp[(x0+x4)>>14];
    blk[8*3] = iclp[(x8+x6)>>14];
    blk[8*4] = iclp[(x8−x6)>>14];
    blk[8*5] = iclp[(x0−x4)>>14];
    blk[8*6] = iclp[(x3−x2)>>14];
    blk[8*7] = iclp[(x7−x1)>>14];
}
/* two dimensional inverse discrete cosine transform */
void Fast_IDCT(block)
short *block;
{
    int i;
    for (i=0; i<8; i++)
        idctrow(block+8*i);
    for (i=0; i<8; i++)
        idctcol (block+i);
}
void Initialize_Fast_IDCT()
{
    int i;
    iclp = iclip+512;
    for (i= −512; i<512; i++)
        iclp[i] = (i<−256) ? −256 : ((i>255) ? 255 : i);
}
```

<< LinearAlgebra 'MatrixManipulation'
ClearAll[ ];    L = 8;

$$\left[ \begin{array}{l} \text{dct} = \text{Table}\left[ \sqrt{\frac{2}{L}} \, \text{Cos}\left[ \pi k\left(n + \frac{1}{2}\right) \middle/ L \right], \, (k, \, O, \, L-1), \, (n, \, O, \, L-1) \right]; \\ \text{dct}[[1]] = \text{dct}[[1]] \middle/ \sqrt{2} \, ; \end{array} \right] \quad \text{—T200}$$

MatrixForm[Simplify[Simplify[dct]]]
MatrixForm[Simplify[N[dct, 8]]]
data = Table[$d_{i,j}$, {i, L}, {j, L}];

$$\left[ \begin{array}{l} \text{dwt} = \text{Table}\left[ \frac{1}{\sqrt{2L}} \left( \text{Cos}\left[ \pi k\left(n - \frac{1}{2}\right) \middle/ L \right] + \text{Cos}\left[ \pi k\left(n + \frac{1}{2}\right) \middle/ L \right] \right), \, (k, \, O, \, L-1), \, (n, \, O, \, L-1) \right]; \\ \text{dwt}[[1]] = \text{dwt}[[1]] \middle/ \sqrt{2} \, ; \end{array} \right]$$

(* MatrixForm[Simplify[dwt])
MatrixForm[Simplify[N[dwt, 8]]]
MatrixForm[BaseForm[Simplify[N[dwt, 8]], 16]]    (* <- *
dataT=dct.data.Transpose[dct];
Chop[N[dataT,2],.001]
dataTI=Transpose[dwt].dataT.dwt;,
MatrixForm[Chop[Simplify[N[dataTI,2]],.001]] *)

$$\begin{pmatrix} \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} \\ \frac{1}{2}\cos\left[\frac{\pi}{16}\right] & \frac{1}{2}\cos\left[\frac{3\pi}{16}\right] & \frac{1}{2}\cos\left[\frac{5\pi}{16}\right] & \frac{1}{2}\cos\left[\frac{7\pi}{16}\right] & \frac{1}{2}\cos\left[\frac{9\pi}{16}\right] & \frac{1}{2}\cos\left[\frac{11\pi}{16}\right] & \frac{1}{2}\cos\left[\frac{13\pi}{16}\right] & \frac{1}{2}\cos\left[\frac{15\pi}{16}\right] \\ \frac{1}{2}\cos\left[\frac{\pi}{8}\right] & \frac{1}{2}\cos\left[\frac{3\pi}{8}\right] & \frac{1}{2}\cos\left[\frac{5\pi}{8}\right] & \frac{1}{2}\cos\left[\frac{7\pi}{8}\right] & \frac{1}{2}\cos\left[\frac{9\pi}{8}\right] & \frac{1}{2}\cos\left[\frac{11\pi}{8}\right] & \frac{1}{2}\cos\left[\frac{13\pi}{8}\right] & \frac{1}{2}\cos\left[\frac{15\pi}{8}\right] \\ \frac{1}{2}\cos\left[\frac{3\pi}{16}\right] & \frac{1}{2}\cos\left[\frac{9\pi}{16}\right] & \frac{1}{2}\cos\left[\frac{15\pi}{16}\right] & \frac{1}{2}\cos\left[\frac{21\pi}{16}\right] & \frac{1}{2}\cos\left[\frac{27\pi}{16}\right] & \frac{1}{2}\cos\left[\frac{33\pi}{16}\right] & \frac{1}{2}\cos\left[\frac{39\pi}{16}\right] & \frac{1}{2}\cos\left[\frac{45\pi}{16}\right] \\ \frac{1}{2\sqrt{2}} & -\frac{1}{2\sqrt{2}} & -\frac{1}{2\sqrt{2}} & \frac{1}{2\sqrt{2}} & \frac{1}{2\sqrt{2}} & -\frac{1}{2\sqrt{2}} & -\frac{1}{2\sqrt{2}} & \frac{1}{2\sqrt{2}} \\ \frac{1}{2}\cos\left[\frac{5\pi}{16}\right] & \frac{1}{2}\cos\left[\frac{15\pi}{16}\right] & \frac{1}{2}\cos\left[\frac{25\pi}{16}\right] & \frac{1}{2}\cos\left[\frac{35\pi}{16}\right] & \frac{1}{2}\cos\left[\frac{45\pi}{16}\right] & \frac{1}{2}\cos\left[\frac{55\pi}{16}\right] & \frac{1}{2}\cos\left[\frac{65\pi}{16}\right] & \frac{1}{2}\cos\left[\frac{75\pi}{16}\right] \\ \frac{1}{2}\cos\left[\frac{3\pi}{8}\right] & \frac{1}{2}\cos\left[\frac{9\pi}{8}\right] & \frac{1}{2}\cos\left[\frac{15\pi}{8}\right] & \frac{1}{2}\cos\left[\frac{21\pi}{8}\right] & \frac{1}{2}\cos\left[\frac{27\pi}{8}\right] & \frac{1}{2}\cos\left[\frac{33\pi}{8}\right] & \frac{1}{2}\cos\left[\frac{39\pi}{8}\right] & \frac{1}{2}\cos\left[\frac{45\pi}{8}\right] \\ \frac{1}{2}\cos\left[\frac{7\pi}{16}\right] & \frac{1}{2}\cos\left[\frac{21\pi}{16}\right] & \frac{1}{2}\cos\left[\frac{35\pi}{16}\right] & \frac{1}{2}\cos\left[\frac{49\pi}{16}\right] & \frac{1}{2}\cos\left[\frac{63\pi}{16}\right] & \frac{1}{2}\cos\left[\frac{77\pi}{16}\right] & \frac{1}{2}\cos\left[\frac{91\pi}{16}\right] & \frac{1}{2}\cos\left[\frac{105\pi}{16}\right] \end{pmatrix} \text{— T202}$$

$$\begin{pmatrix} 0.35355339 & 0.35355339 & 0.35355339 & 0.35355339 & 0.35355339 & 0.35355339 & 0.35355339 & 0.35355339 \\ 0.49039264 & 0.41573481 & 0.27778512 & 0.097545161 & -0.097545161 & -0.27778512 & -0.41573481 & -0.49039264 \\ 0.46193977 & 0.19134172 & -0.19134172 & -0.46193977 & -0.46193977 & -0.19134172 & 0.19134172 & 0.46193977 \\ 0.41573481 & -0.097545161 & -0.49039264 & -0.27778512 & -0.27778512 & 0.49039264 & 0.097545161 & -0.41573481 \\ 0.35355339 & -0.35355339 & -0.35355339 & 0.35355339 & 0.35355339 & -0.35355339 & -0.35355339 & 0.35355339 \\ 0.27778512 & -0.49039264 & 0.097545161 & 0.41573481 & -0.41573481 & -0.097545161 & 0.49039264 & -0.27778512 \\ 0.19134172 & -0.46193977 & 0.46193977 & -0.19134172 & -0.19134172 & 0.46193977 & -0.46193977 & 0.19134172 \\ 0.097545161 & -0.27778512 & 0.41573481 & -0.49039264 & 0.49039264 & -0.41573481 & 0.27778512 & -0.097545161 \end{pmatrix} \text{— T204}$$

$$\begin{pmatrix} 0.35355339 & 0.35355339 & 0.35355339 & 0.35355339 \\ 0.45306372 & 0.18766514 & -0.18766514 & -0.45306372 \\ 0.32664074 & -0.32664074 & -0.32664074 & 0.32664074 \\ 0.15909482 & -0.38408888 & 0.38408888 & -0.15909482 \\ 0 & 0 & 0 & 0 \\ -0.10630376 & 0.25663998 & -0.25663998 & 0.10630376 \\ -0.13529903 & 0.13529903 & 0.13529903 & -0.13529903 \\ -0.090119978 & -0.037328917 & 0.037328917 & 0.090119978 \end{pmatrix} \text{— T206}$$

$$\begin{pmatrix} ((0.5a8279a_{16}, 0.5aa8279a_{16}, 0.5a8279a_{16}, 0.5a8279a_{16}), (0.73fbfbff_6, 0.300ad29_{16}, -0.300ad29_{16}, -0.73fbfbf_{16}), \\ (0.539eba4_{16}, -0.539eba4_{16}, -0.539eba4_{16}, 0.539eba4_{16}), (0.28ba703_{16}, -0.6253a61_{16}, 0.6253a61_{16}, -0.28ba703_{16}), \\ (0_{16}, 0_{16}, 0_{16}, 0_{16}), (-0.1b36b93_{16}, 0.41b3287_{16}, -0.41b3287_{16}, 0.1b36b93_{16}), \\ (-0.22a2f4f_{16}, 0.22a2f4f_{16}, 0.22a2f4f_{16}, -0.22a2f4f_{16}), (-0.17121a5_{16}, -0.098e634e_{16}, 0.098e634e_{16}, 0.17121a5_{16})) \end{pmatrix} \text{— T208}$$

```
w1 = dwt[[1, 1]]; w2 = dwt[[3, 1]]; w3 = dwt[[7, 1]];
w4 = dwt[[2, 1]]; w5 = dwt[[4, 1]]; w6 = dwt[[6, 1]]; w7 = dwt[[8, 1]];
w8 = dwt[[2, 2]]; w9 = dwt[[4, 2]]; w10 = dwt[[6,2]]; w11 = dwt[[8, 2]];
x0 = w1.b0;
x1 = w2 b2 - w3 b6;
x2 = x0 + x1;
x3 = w4 b1 + w5 b3 - w6 b5 - w7 b7;
x4 = w8 b1 - w9 b3 + w10 b5 - w11 b7;
x5 = x0 - x1;
out0 = x2 + x3;
out1 = x5 + x4;
aut2 = x5 - x1;
out3 = x2 - x3;
b0 = 1; b1= 0; b2 = 0; b3 = 0; b4 = 0; b5 = 0; b6 = 0; b7 = 0;
N out0, 4
N out1, 4
b0 = 0; b1 = 1; b2 = 0; b3 = 0; b4 = 0; b5 = 0; b6 0; b7 = 0;
N[out0, 4]
N[out1, 4]
N[out2, 4]
N[out3, 4]
 0.4619
 0.1913
-0.1913
-0.4619
b0 = 0; b1 = 0; b2 = 1; b3 = 0; b4 = 0; b5 = 0; b6 = 0; b7 = 0;
```

```
N[out0, 4]
N[out1, 4]
N[out2, 4]
N[out3, 4]
 0.3536
-0.3536
-0.3536
 0.3536
b0 = 0; b1 = 0; b2 = 0; b3 = 1; b4 = 0; b5 = 0; b6 = 0; b7 = 0;
N[out0, 4]
N[out1, 4]
N[out2, 4]
N[out3, 4]
 0.1913
 0.4619
-0.4619
-0.1913
b0 = 0; b1 = 0; b2 = 0; b3 = 0; b4 = 1; b5 = 0; b6 = 0; b7 = 0;
N out0, 4
N out1, 4
```

TABLE 3

```
/***********************************************
 *
 * Copyright 1996–1997 Samsung North America
 * All: Rights Reserved.
 *
 * Samsung Information System America
 * 3655 North First Street
 *San Jose, CA 95134-1713
 *
 * File: idwt.c
 *
 * Authors: Musa Jahanghir, Jack Chaney, Michael Kaufman
 *
 * Description: Inverse discrete wavelet transformations.
 *
 *
 * Notes:
 *
 *
 ***********************************************
#include "math.h"
#include "config.h"
#ifndef PI
# ifdef M_PI
#  define PI M_PI
# else
# define PI 3.14159265358979323846
# endif
#endif
/******************
/* IDWT Coefficients follow */
/* Full precision */
/*
#define W1    0x5a8279a
#define W2    0x539eba4
#define W3    0x22a2f4f
#define W4    0x73fbfbf
#define W5    0x28ba703
#define W6    0x1b36b93
#define W7    0x17121a5
#define W8    0x300ad29
#define W9    0x6253a61
#define W10   0x41b3287
#define W11   0x098e634
*/
/* Truncated to 32 bit */
#define W1    0x5a82
#define W2    0x539f
#define W3    0x22a3
#define W4    0x73fc
#define W5    0x28ba
#define W6    0x1b37
#define W7    0x1712
#define W8    0x300b
#define W9    0x6254
#define W10   0x41b3
#define W11   0x098e
/* Rounded to 32 bit */
/*
#define W1    0x5a83
#define W2    0x539e
#define W3    0x22a2
#define W4    0x73fb
#define W5    0x28ba
#define W6    0x1b36
#define W7    0x1712
#define W8    0x300a
#define W9    0x6253
#define W10   0x41b3
#define W11   0x098e
*/
/* private prototypes */
static void idwtrow__ANSI_ARGS__((short *blk));
static vbid idwtcol__ANSI_ARGS__((short *blk));
/* private data */
/* clipping table */
static short iclip[1024];
static short *iclp;
/* cosine transform matrix for 8x1 IDWT */
static double c[8][8];
/**********************/
/* Horizontal IDWT (row)    */
/* ************************** */
void idwtrow(short *blk)
{
    int x0, x1, x2, x3, x4, x5;
    x0 = W1*blk[0];
    x1 = (W2*blk[2]) - (W3*blk[6]);
    x2 = x0 + x1;
    x3 = (W4*blk[1]) + (W5*blk[3]) - (W6*blk[5]) - (W7*blk[7]);
    x4 = (W8*blk[1]) - (W9*blk[3]) + (W10*blk[5]) - (W11*blk[7]);
    x5 = x0–x1;
    blk[0] = (x2 + x3) >> 14;
    blk[1] = (x5 + x4) >> 14;
    blk[2] = (x5 - x4) >> 14;,
    blk[3] = (x2–x3) >> 14;
    blk[4] = blk[5] = blk[6] = blk[7] = 0;
}
/***********************/
/* Vertical IDWT (column)   */
/*********************/
void idwtcol(short *blk)
{
    int x0, x1, x2, x3, x4, x5;
```

TABLE 3-continued

```
    x0 = W1*blk[0];
    x1 = (W2*blk[16]) - (W3*blk[48]);
    x2 = x0 + x1;
    x3 = (W4*blk[8]) + (W5*blk[24]) - (W6*blk[40]) - (W7*blk[56]);
    x4 = (W8*blk[8]) - (W9*blk[24]) + (W10*blk[40]) -
      (W11*blk[56]);
    x5 = x0 - x1;
    blk[0] = iclp[(x2 + x3) >> 18];
    blk[8] = iclp[(x5 + x4) >> 18];
    blk[16] = iclp[(x5 - x4) >> 18];
    blk[24] = iclp[(x2 - x3) >> 18];
    blk[32] = blk[40] = blk[48] = blk[56] = 0;
}
/****************************/
/* Fast_IDWT algorithm */
/****************************/
void Fast_IDWT (short *block)
{
    int i,j;
    int x;
    for (i=0; i<8; i++)
      idwtrow(block+8*i);
    for (i=0; i<4; i++)
      idwtcol(block+i);
}
/*************************************/
/* Initialize clipping for Fast_IDWT */
/*************************************/
void Initialize_Fast_IDWT(void)
{
    int i;
    iclp = iclip+512;
    for (i = -512; i<512; i++
      iclp[i] = (i<-256) ? -256 : ((i > 255) ? 255 : i);
}
/************************************/
/* Initialize DWT coefficient matrix **/
/ ************************************/
void Initiaiize_Reference_IDWT(void)
{
    int freq, time;
    double scale;
    for (freq = 0; freq < 8; freq++)
      scale = (freq == 0) ? sqrt(0.125) : 0.5;
      for (time = 0; time<8; time ++)
      {
        c[freq] [time] = scale*cos((PI/8.0)*freq*(time + 0.5));
      }
    }
}
/***********************************/
/* Full precision IDWT transformation */
/***********************************/
void IDWT(short *block)
{
    int i, j, k, v;
    double partial_product;
    double tmp[64];
    for (i=0; i<8; i++)
      for (j=0; j<8; j+=2)
        partial_product = 0.0;
        for (k=0; k<8; k++)
          partial_product += (c[k][j] + c[k][j+1])*block[8*i+k];
        tmp[8*j+j/2] = partial_product/2;
    /* Transpose operation is integrated into address mapping by
    switching
        loop order of i and j */
    for (j=0; j<4; j++)
    for (i=0; i<4; i++)
    {
      partial_product = 0.0;
      for (k=0; k<8; k++)
        partial_product+= (c[k][i] + c[k][i+1])*tmp[8*k+j];
      v = (int) floor(partial_product/2+0.5);
      block[8*i+j] = (v<-256) ? -256 : ((v>255) ? 255 : v);
    }
}
```

What is claimed is:

1. A method for processing image data that has been encoded using a discrete cosine transform to provide reduced image data having a relatively lower definition than the image data, the method comprising the steps of:

receiving image data that has been encoded using a discrete cosine transform;

processing the received image data with an inverse discrete cosine transform (IDCT) to cause IDCT processed image data to be generated, wherein the IDCT processed image data has the same definition as the image data, separately processing the received image data with an inverse discrete wavelet transform (IDWT) to cause IDWT reduced image data to be generated, wherein the IDWT reduced image data has a relatively lower definition than the image data; and generating reduced image data using both the IDCT processed image data and the IDWT reduced image data, wherein the reduced image data has a relatively higher definition than the IDWT reduced image data and a relatively lower definition than the image data.

2. The method of claim 1, wherein the IDWT is of the form:

$$f(x) = \frac{1}{\sqrt{2}}(U(x) + 0)),$$

where $$U(x) = \frac{1}{\sqrt{2}}(idct(x) + idct(x+1))$$

and where $$idct(x) = \sqrt{\frac{2}{N}} \sum_{u=0}^{N-1} c(u)F(u)\cos\frac{(2x+1)}{2N}u\pi$$

and the calculation of the IDWT is performed in a single step.

3. The method of claim 2, wherein a set of coefficients (W1–W11) are used in processing the image data with the IDWT, the set of coefficients (W1–W11) being defined as a set of hexadecimal numbers consisting of: 0x5a8279a, 0x539eba4, 0x22a2f4f, 0x73fbfbf, 0x28ba703, 0x1b36b93, 0x17121a5, 0x300ad29, 0x6253a61, 0x41b3287 and 0x098e634.

4. The method of claim 1, wherein the image data is HDTV image data and the reduced image data is SDTV image data.

5. The method of claim 4, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 960 by 540 pixels of $U_C$ data and 960 by 540 pixels of $V_C$ data.

6. The method of claim 4, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 480 by 270 pixels of $U_W$ data and 960 by 540 pixels of $V_C$ data.

7. The method of claim 4, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 960 by 540 pixels of $U_C$ data and 480 by 270 pixels of $V_W$ data.

8. A computer-readable medium carrying one or more sequences of one or more instructions for processing image data that has been encoded using a discrete cosine transform to provide reduced image data having a relatively lower definition than the image data, wherein the execution of the one or more sequences of one or more instructions by one or more processors causes the one or more processors to perform the steps of:

receiving image data that has been encoded using a discrete cosine transform;

processing the received image data with an inverse discrete cosine transform (IDCT) to cause IDCT processed image data to be generated, wherein the IDCT processed image data has the same definition as the image data, separately processing the received image data with an inverse discrete wavelet transform (IDWT) to cause IDWT reduced image data to be generated, wherein the IDWT reduced image data has a relatively lower definition than the image data; and generating reduced image data using both the IDCT processed image data and the IDWT reduced image data, wherein the reduced image data has a relatively higher definition than the IDWT reduced image data and a relatively lower definition than the image data.

9. The computer-readable medium of claim 8, wherein the IDWT is of the form:

$$f(x) = \frac{1}{\sqrt{2}}(U(x) + 0)),$$

where $$U(x) = \frac{1}{\sqrt{2}}(idct(x) + idct(x+1))$$

and where $$idct(x) = \sqrt{\frac{2}{N}} \sum_{u=0}^{N-1} c(u)F(u)\cos\frac{(2x+1)}{2N}u\pi$$

and the calculation of the IDWT is performed in a single step.

10. The computer-readable medium of claim 9, wherein a set of coefficients (W1–W11) are used in processing the image data with the IDWT, the set of coefficients (W1–W11) being defined as a set of hexadecimal numbers consisting of:

0x5a8279a, 0x539eba4, 0x22a2f4f, 0x73fbfbf, 0x28ba703, 0x1b36b93, 0x17121a5, 0x300ad29, 0x6253a61, 0x41b3287 and 0x098e634.

11. The computer-readable medium of claim 8, wherein the image data is HDTV image data and the converted image data is SDTV image data.

12. The computer-readable medium of claim 11, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 960 by 540 pixels of $U_C$ data and 960 by 540 pixels of $V_C$ data.

13. The computer-readable medium of claim 11, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 480 by 270 pixels of $U_W$ data and 960 by 540 pixels of $V_C$ data.

14. The computer-readable medium of claim 11, wherein:

the HDTV image data consists of 1920 by 1080 pixels of data, the IDCT processed image data consists of 1920 by 1080 pixels of $Y_C$ data, 960 by 540 pixels of $U_C$ data and 960 by 540 pixels of $V_C$ data, the IDWT reduced image data consists of 960 by 540 pixels of $Y_W$ data, 480 by 270 pixels of $U_W$ data and 480 by 270 pixels of $V_W$ data, and the reduced image data consists of 960 by 540 pixels of $Y_W$ data, 960 by 540 pixels of $U_C$ data and 480 by 270 pixels of $V_W$ data.

15. A system for processing image data that has been encoded using a discrete cosine transform to provide reduced image data having a relatively lower definition than the image data, the system comprising:

a receiver for receiving image data that has been encoded using a discrete cosine transform;

a decoder having an inverse discrete cosine transform (IDCT) process configured to decode the received image data and cause IDCT processed image data to be generated, wherein the IDCT processed image data has the same definition as the image data, and an inverse discrete wavelet transform (IDWT) process configured to separately decode the received image data and cause IDWT reduced image data to be generated, wherein the IDWT reduced image data has a relatively lower definition than the image data; and a generator for generating reduced image data using both the IDCT processed image data and the IDWT reduced image data, wherein the reduced image data has a relatively higher definition than the IDWT reduced image data.

16. The system of claim 15, wherein the inverse discrete wavelet transform is of the form:

$$f(x) = \frac{1}{\sqrt{2}}(U(x) + 0)),$$

where $$U(x) = \frac{1}{\sqrt{2}}(idct(x) + idct(x+1))$$

and where $$idct(x) = \sqrt{\frac{2}{N}} \sum_{u=0}^{N-1} c(u)F(u)\cos\frac{(2x+1)}{2N}u\pi$$

and the calculation of the IDWT is performed in a single step.

17. The system of claim 16, wherein a set of coefficients (W1–W11) are used in applying the IDWT to the image data and the set of coefficients (W1–W11) is defined as a set of hexadecimal numbers consisting of: 0x5a8279a, 0x539eba4, 0x22a2f4f, 0x73fbfbf, 0x28ba703, 0x1b36b93, 0x17121a5, 0x300ad29, 0x6253a61, 0x41b3287 and 0x098e634.

18. The system of claim 15, wherein the image data is HDTV image data and the converted image data is SDTV image data.

19. The system of claim 18, wherein:
the HDTV image data consists of 1920 by 1080 pixels of data,
the IDCT processed image data consists of 1920 by 1080 pixels of $Y_C$ data, 960 by 540 pixels of $U_C$ data and 960 by 540 pixels of $V_C$ data,
the IDWT reduced image data consists of 960 by 540 pixels of $Y_W$ data, 480 by 270 pixels of $U_W$ data and 480 by 270 pixels of $V_W$ data, and
the reduced image data consists of 960 by 540 pixels of $Y_W$ data, 960 by 540 pixels of $U_C$ data and 960 by 540 pixels of $V_C$ data.

20. The system of claim 18, wherein:
the HDTV image data consists of 1920 by 1080 pixels of data,
the IDCT processed image data consists of 1920 by 1080 pixels of $Y_C$ data, 960 by 540 pixels of $U_C$ data and 960 by 540 pixels of $V_C$ data,
the IDWT reduced image data consists of 960 by 540 pixels of $Y_W$ data, 480 by 270 pixels of $U_W$ data and 480 by 270 pixels of $V_W$ data, and
the reduced image data consists of 960 by 540 pixels of $Y_W$ data, 480 by 270 pixels of $U_W$ data and 960 by 540 pixels of $V_C$ data.

21. The system of claim 18, wherein:
the HDTV image data consists of 1920 by 1080 pixels of data,
the IDCT processed image data consists of 1920 by 1080 pixels of $Y_C$ data, 960 by 540 pixels of $U_C$ data and 960 by 540 pixels of $V_C$ data,
the IDWT reduced image data consists of 960 by 540 pixels of $Y_W$ data, 480 by 270 pixels of $U_W$ data and 480 by 270 pixels of $V_W$ data, and
the reduced image data consists of 960 by 540 pixels of $Y_W$ data, 960 by 540 pixels of $U_C$ data and 480 by 270 pixels of $V_W$ data.

* * * * *